United States Patent [19]

Elder

[11] 3,724,270
[45] Apr. 3, 1973

[54] FLAG ARM RETAINING SYSTEM
[75] Inventor: Raymond H. Elder, Dallas, Tex.
[73] Assignee: Elder Machinery and Tool Engineering Company, Dallas, Tex.
[22] Filed: Nov. 17, 1971
[21] Appl. No.: 199,490

[52] U.S. Cl. .................................................73/267
[51] Int. Cl. ..............................................G01f 3/20
[58] Field of Search.........................................73/267

[56] References Cited

UNITED STATES PATENTS 3,161,049  12/1964  St. Clair et al..........................73/267

Primary Examiner—Richard C. Queisser
Assistant Examiner—John P. Beauchamp
Attorney—D. Carl Richards et al.

[57] ABSTRACT

A gas meter includes diaphragms which are cyclically expanded and contracted and flag arms supported for oscillation by the diaphragms. The flag arms are connected to the diaphragms by generally S-shaped flag arm retaining members which are secured to the diaphragms in oppositely facing directions to define open-ended flag arm receiving slots.

10 Claims, 3 Drawing Figures

FLAG ARM RETAINING SYSTEM

BACKGROUND AND SUMMARY OF THE INVENTION

This invention relates to a flag arm retaining system, and more particularly to improved structure for interconnecting the diaphragms and the flag arms of a gas meter.

One type of gas meter that has gained wide acceptance comprises a housing having gas inlet and outlet ports and a pair of diaphragms mounted in the housing for cyclical expansion and contraction under the pressure of gas flowing therethrough. Apparatus mounted in the upper portion of the housing is actuated by the diaphragms to record the volume of gas flowing through the meter and to control the flow of gas into and out of the diaphragms. The flow recording and controlling apparatus is connected to the diaphragms by a pair of flag arms.

The flag arms of the gas meter are pivotally supported and include connecting portions which extend perpendicularly to the direction of expansion and contraction of the diaphragms. The flag arms have heretofore been connected to the diaphragms by retaining members comprising an eye which receives the connecting portion of the flag arm, an eye receiving member mounted on the diaphragm, and a cotter pin for retaining the eye in the eye receiving member. This type of flag arm retaining member exhibits a number of inherent disadvantages. First, the retaining member comprises three relatively complicated parts and is therefore expensive to manufacture. Second, the retaining member is relatively complicated to assemble and disassemble which increases the cost and complexity of servicing a gas meter. Third, due to the pivotal mounting of the flag arms, at least some relative lateral movement between the flag arms and the diaphragms is necessary during each expansion and contraction of the diaphragms. However, lateral movement is not permitted by the retaining members that have been used heretofore, so that binding occurs during each expansion and contraction of the diaphragms.

The present invention comprises an improved flag arm retaining system which overcomes the foregoing and other disadvantages that are characteristic of the prior art. In accordance with the preferred embodiment of the invention, each flag arm of a gas meter is secured to its diaphragm by a pair of S-shaped flag arm retaining members which are mounted on the diaphragm in oppositely facing directions to define open-ended flag arm retaining slots which extend mutually perpendicularly to the direction of expansion and contraction of the diaphragm and to the connecting portion of the flag arm. The use of the invention is highly economical in that flag arm retaining members constructed in accordance with the invention are considerably less costly to manufacture than prior art flag arm retaining members and in that gas meter servicing is greatly simplified when flag arm retaining members incorporating the invention are utilized. Perhaps more importantly, flag arm retaining members incorporating the invention permit relative lateral motion between a flag arm and its diaphragm so that no binding occurs during expansion and contraction of the diaphragm.

DESCRIPTION OF THE DRAWING

A more complete understanding of the invention may be had by referring to the following Detailed Description when taken in conjunction with the accompanying Drawing, wherein.

DETAILED DESCRIPTION

Figure 1:
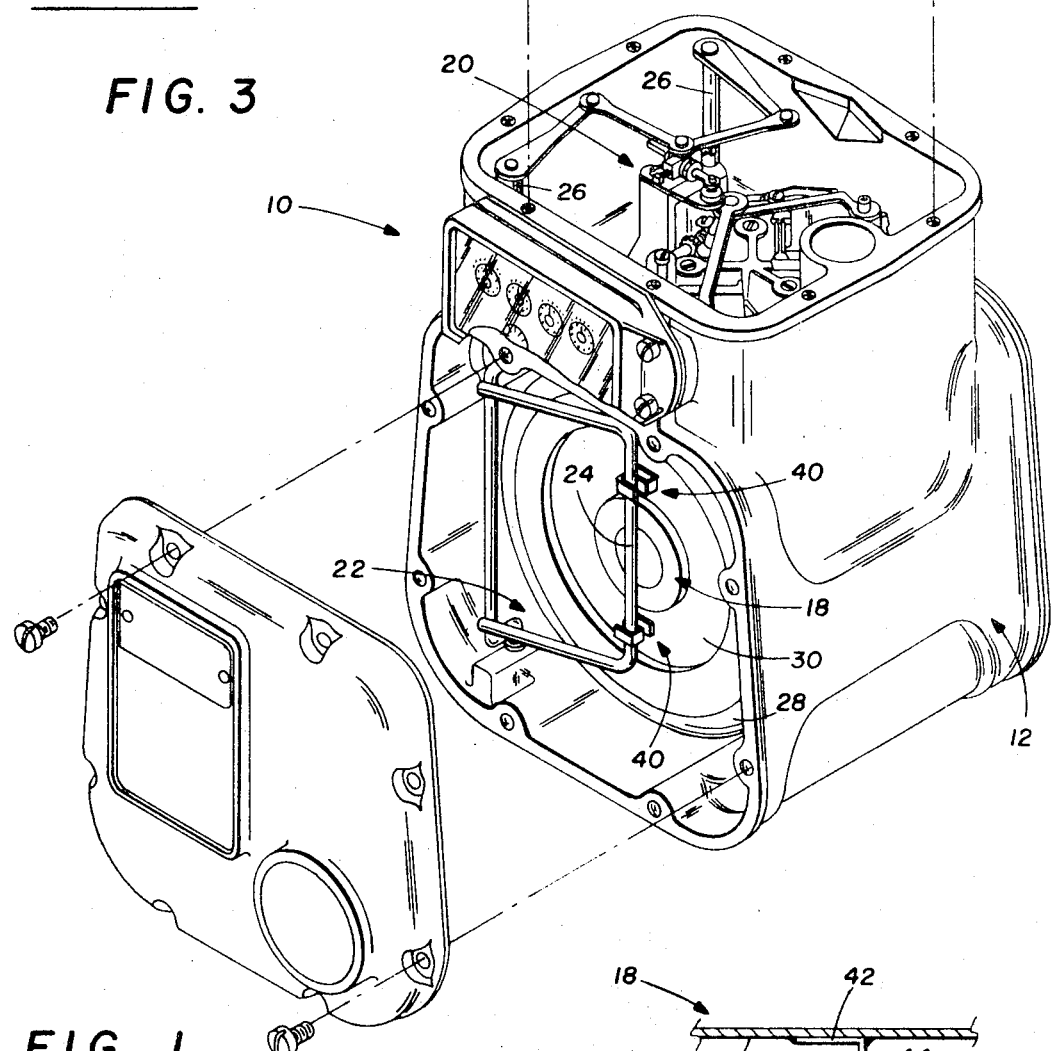
FIG. 1 is a perspective view of a gas meter incorporating the invention.

Referring now to the Drawing, and particularly to FIG. 1 thereof, there is shown a gas meter 10 incorporating the preferred embodiment of the present invention. The gas meter 10 includes a housing 12 having inlet and outlet ports 14 and 16 formed therein. A pair of diaphragms 18 are mounted in the housing 12 for cyclical expansion and contraction under the pressure of gas flowing through the housing 12. The gas meter 10 further includes apparatus 20 mounted in the upper portion of the housing 12 for actuation by the diaphragms 18 to record the volume of gas flowing through the gas meter and to control the flow of gas into and out of the diaphragms 18.

The flow recording and controlling apparatus 20 is connected to the diaphragms 18 of a gas meter 10 by a pair of flag arms 22. Each flag arm 22 is pivotally supported in the housing 12 and includes a diaphragm connecting portion 24 which extends perpendicularly to the direction of expansion and contraction of the diaphragm 18. Each flag arm 22 further includes a portion 26 which is connected to the flow recording and controlling apparatus 20.

More particularly, each diaphragm 18 of the gas meter 10 comprises a rubber portion 28 and a metal plate 30 which is reciprocated inwardly and outwardly during expansion and contraction of the diaphragm. The connecting portion 24 of the flag arm 22 corresponding to each diaphragm 18 is secured to the metal plate 30 by a flag arm retaining member so that expansion and contraction of the diaphragm causes pivotal oscillation of the flag arm relative to the housing. This oscillation is in turn transferred to the gas flow recording and controlling apparatus 20 to effect the operation thereof.

Figure 3:
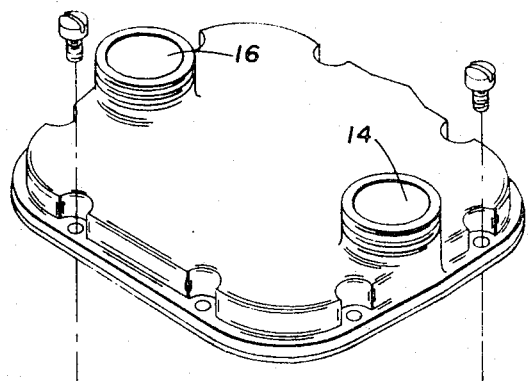
FIG. 3 is an illustration of a prior art flag arm retaining member.
Figure 3:
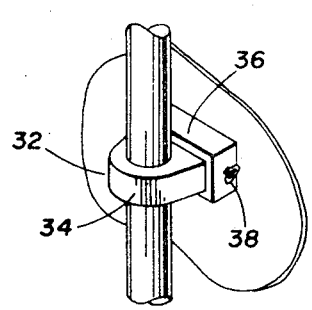

Referring now to FIG. 3, there is shown a prior art flag arm retaining member 32. The retaining member 32 comprises an eye 34 which receives the connecting portion 24 of the flag arm and which is in turn received by an eye receiving member 36. The eye receiving member 36 is bonded to the metal plate 30 of a gas meter diaphragm and the eye 34 is secured to the eye receiving member by a cotter pin 38. By this means the flag arm of a gas meter is secured to the diaphragm for actuation thereby.

The type of flag arm retaining member illustrated in FIG. 3 incorporates a number of highly disadvantageous characteristics. First, both the eye 34 and the eye receiving member 36 of the flag arm retaining member 32 are non-standard parts which are relatively expensive to manufacture. Second, the use of the flag arm retaining member of the type shown in FIG. 3 increases the cost of servicing a gas meter because the cotter pin 38 must be removed whenever the flag arm is to be disconnected from the diaphragm. Finally, the eye 34 and the eye receiving member 36 of the flag arm retaining member 32 do not accommodate lateral motion between the flag arm and the diaphragm. This causes binding between the flag arm and the diaphragm during each expansion and contraction of the diaphragm.

Figure 2:
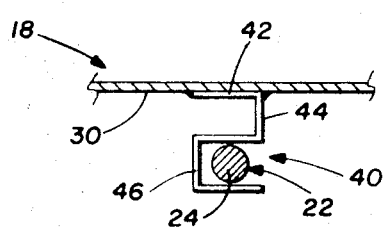
FIG. 2 is an enlarged sectional view illustrating the invention.

Referring now to FIGS. 1 and 2, the present invention comprises an improved flag arm retaining system which overcomes the foregoing and other deficiencies that have long been associated with the prior art. In accordance with the preferred embodiment of the invention each flag arm of a gas meter is secured to its corresponding diaphragm by a pair of generally S-shaped flag arm retaining members 40. The retaining members 40 are preferably formed from metal and are preferably mounted on the metal plate of a gas meter diaphragm by soldering. However, as will be appreciated by those skilled in the art, the retaining members 40 may be formed from other materials and may be mounted using other techniques, if desired.

The retaining members 40 are preferably mounted on the metal plate 30 of the diaphragm 18 in oppositely facing directions. The flag arm retaining members 40 thus define oppositely facing open-ended slots which extend mutually perpendicularly to the direction of expansion and contraction of the diaphragm and to the direction of the connecting portion 24 of the flag arm 22. More particularly, each flag arm retaining member 40 comprises a foot 42 which is bonded to the metal plate of one of the diaphragms 18 of the gas meter 10. A leg 44 extends outwardly from the foot 42 and supports a generally U-shaped member 46. The U-shaped member 46 surrounds the flag arm 22 and therefore connects the flag arm to the diaphragm.

The use of the present invention results in numerous advantages over the prior art. First, the flag arm retaining members 40 may be formed from any convenient material, such as sheet metal, and by means of any of various manufacturing techniques which are commonly employed in the manufacture of small parts, such as stamping. Thus, the flag arm retaining members 40 are extremely economical to manufacture. Secondly, the use of the present invention greatly facilitates the assembly and disassembly of gas meters since it permits the flag arm to be connected to or disconnected from the diaphragm by simply rotating the diaphragm sufficiently to engage or disengage the connecting portion of the flag arm with the U-shaped members of the flag arm retaining members. It has been found that this simplified procedure greatly reduces the amount of time that is required to perform routine maintenance operations on a gas meter. Third, and perhaps most important, the use of the present invention prevents binding between the diaphragms and the flag arms during expansion and contraction of the diaphragms. That is, since the connecting portions of the flag arms are received in slots, relative lateral motion between the flag arms and the diaphragms is permitted. This results not only in a much freer running gas meter, but also in reduction of wear both in the flag arm retaining members and in the diaphragms.

From the foregoing, it will be understood that in accordance with the present invention, a gas meter comprises a diaphragm, a flag arm, and a flag arm retaining member comprising an open-ended slot which receives the flag arm to connect the flag arm to the diaphragm. More particularly, the flag arm retaining member comprises a generally U-shaped member which receives the flag arm in a slot extending mutually perpendicularly to the direction of expansion and contraction of the diaphragm and to the flag arm. The use of the invention is advantageous in that substantial cost savings are effected and in that relative lateral motion is permitted between the flag arm and the diaphragm during expansion and contraction of the diaphragm, whereby any possibility of binding is eliminated.

Although the preferred embodiment of the invention has been illustrated in the accompanying Drawing and described in the foregoing Detailed Description, it will be understood that the invention is not limited to the embodiment disclosed, but is capable of rearrangement, modification, and substitution of parts and elements without departing from the spirit of the invention.

What is claimed is:

1. A gas meter comprising:
    a diaphragm for receiving gas and for cyclical expansion and contraction under the pressure thereof;
    apparatus for actuation by the diaphragm to control the flow of gas into and out of the diaphragm and to record the volume of gas flow;
    a flag arm including a portion extending perpendicularly to the direction of expansion and contraction of the diaphragm for transferring the action of the diaphragm to the controlling and recording apparatus; and
    a flag arm retaining member secured to the diaphragm and defining an open-ended flag arm receiving slot surrounding the flag arm on three sides and extending perpendicularly to the flag arm and to the direction of expansion and contraction of the diaphragm.

2. The gas meter according to claim 1 further characterized by a second flag arm retaining member secured to the diaphragm and defining an open-ended flag arm receiving slot surrounding the flag arm on three sides and extending in the opposite direction from the flag arm receiving slot comprising the first flag arm retaining member.

3. The gas meter according to claim 2 wherein the diaphragm further comprises a metal plate mounted for reciprocation upon expansion and contraction of the diaphragm and wherein each flag arm retaining member comprises a foot secured to the metal plate of the diaphragm, a leg extending outwardly from the foot, and a U-shaped member supported on the leg and receiving the flag arm.

4. The gas meter according to claim 3 wherein the flag arm retaining members comprise unitary, generally S-shaped members which are mounted on the metal plate of the diaphragm in oppositely facing directions.

5. In a gas meter of the type including a diaphragm that is expanded and contracted under the pressure of gas flowing through the meter, apparatus responsive to the motion of the diaphragm for recording the volume of gas flowing through the meter and for controlling the flow of gas into and out of the diaphragm, and a flag arm for transferring the motion of the diaphragm to the flow recording and controlling apparatus, the improvement comprising:

a pair of members secured to the diaphragm for receiving the flag arm, one of said members comprising an open-ended flag arm receiving slot which faces in one direction relative to the flag arm and the other of said members comprising an open-ended flag arm receiving slot which faces in the opposite direction relative to the flag arm, whereby relative lateral motion between the flag arm and the diaphragm is permitted during the expansion and contraction of the diaphragm.

6. The improvement according to claim 5 wherein the flag arm receiving members comprise a pair of identical S-shaped members secured to the diaphragm in oppositely facing directions.

7. The improvement according to claim 5 wherein the diaphragm includes a metal plate which is reciprocated during expansion and contraction of the diaphragm and wherein each flag arm receiving member comprises a foot which is bonded to the metal plate, a leg extending outwardly from the foot, and a U-shaped member mounted on the foot for receiving the flag arm.

8. The gas meter comprising:

a housing including gas inlet and outlet ports;

at least one diaphragm mounted in the housing for cyclical expansion and contraction under the pressure of gas flowing therethrough:

apparatus mounted in the housing for actuation by the diaphragm to record the volume of gas flowing through the meter and to control the flow of gas into and out of the diaphragm;

a flag arm including a portion extending perpendicularly to the direction of expansion and contraction of the diaphragm for transferring the motion of the diaphragm to the flow recording and controlling apparatus; and a pair of generally S-shaped flat arm retaining members each comprising a foot bonded to the diaphragm, a leg extending outwardly from the foot, and a U-shaped member secured to the leg and surrounding the flag arm on three sides.

9. The gas meter according to claim 8 wherein the U-shaped members of the flag arm retaining members define open-ended slots which extend mutually perpendicularly to the direction of expansion and contraction of the diaphragm and to the flag arm.

10. The gas meter according to claim 8 wherein the open ends of the U-shaped members of the flag arm retaining members face in opposite directions relative to the flag arm.

* * * * *